(12) United States Patent
Gale et al.

(10) Patent No.: US 12,098,856 B2
(45) Date of Patent: Sep. 24, 2024

(54) POWERED ROOM AIR PURIFIER WITH AIR-QUALITY VISUAL INDICATOR

(71) Applicant: 3M INNOVATIVE PROPERTIES COMPANY, St. Paul, MN (US)

(72) Inventors: Brian D. Gale, Blaine, MN (US); Andrew R. Fox, Oakdale, MN (US); Alonso M. Hernandez, Minneapolis, MN (US); Gregory G. Jager, Oakdale, MN (US); Abby R. Lemon, Vadnais Heights, MN (US); Nicolas W. Tremain, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 323 days.

(21) Appl. No.: 17/779,712

(22) PCT Filed: Dec. 9, 2020

(86) PCT No.: PCT/IB2020/061666
§ 371 (c)(1),
(2) Date: May 25, 2022

(87) PCT Pub. No.: WO2021/116922
PCT Pub. Date: Jun. 17, 2021

(65) Prior Publication Data
US 2022/0404054 A1 Dec. 22, 2022

Related U.S. Application Data

(60) Provisional application No. 62/946,222, filed on Dec. 10, 2019.

(51) Int. Cl.
*B01D 46/42* (2006.01)
*F24F 8/108* (2021.01)
(Continued)

(52) U.S. Cl.
CPC .......... *F24F 11/52* (2018.01); *B01D 46/4254* (2013.01); *F24F 8/108* (2021.01); *B01D 2279/50* (2013.01); *F24F 2110/50* (2018.01)

(58) Field of Classification Search
CPC ... B01D 46/4254; B01D 2279/50; F24F 3/16; F24F 11/52; F24F 8/108; F24F 110/50;
(Continued)

(56) References Cited

U.S. PATENT DOCUMENTS 5,428,964 A * 7/1995 Lobdell .................. G05D 27/02
340/672
5,727,862 A 3/1998 Wu
(Continued)

FOREIGN PATENT DOCUMENTS

CN 1651119 A 8/2005
CN 201209781 Y 3/2009
(Continued)

OTHER PUBLICATIONS

"ANSI Z87.1-2003: Practice for Occupational and Educational Eye and Face Protection", Approved American National Standard, 2003, pp. 1-73.
(Continued)

*Primary Examiner* — Minh Chau T Pham
(74) *Attorney, Agent, or Firm* — Kenneth B. Wood (57) ABSTRACT

A powered room air purifier with a visual indicator of air quality, the visual indicator including: a reflector that defines a forwardly-open-ended reflecting cavity and that includes at least one through-opening in a floor or ceiling of the reflector; at least one diffuser layer that covers the forward opening of the forward-open-ended reflecting cavity; and, at least one LED light source that is positioned within the at least one through-opening, the LED light source and the reflector being configured so that the LED light source is
(Continued)

shielded from line-of-sight view along a forward-rearward axis of the powered room air purifier.

20 Claims, 9 Drawing Sheets

(51) Int. Cl.
*F24F 11/52* (2018.01)
*F24F 110/50* (2018.01)

(58) Field of Classification Search
CPC ........ F24F 2110/50; F21V 7/04; F21V 33/00; F21Y 115/10
USPC ............ 55/385.1, 471–473, DIG. 34; 96/417
See application file for complete search history.

(56) References Cited

U.S. PATENT DOCUMENTS

| | | | |
|---|---|---|---|
| 6,282,821 B1 | 9/2001 | Freier | |
| 6,494,940 B1* | 12/2002 | Hak | B01D 46/10 96/417 |
| 6,660,070 B2* | 12/2003 | Chung | B01D 46/442 96/417 |
| 6,821,007 B1 | 11/2004 | Olman et al. | |
| 6,979,361 B2* | 12/2005 | Mihayiov | B01D 46/0086 96/417 |
| 7,537,648 B1* | 5/2009 | Karwacki | B01D 46/0086 96/417 |
| 7,938,896 B2* | 5/2011 | Paterson | B03C 3/32 96/417 |
| 8,469,575 B2 | 6/2013 | Weber et al. | |
| 8,974,585 B2* | 3/2015 | Hartmann | B01D 46/4254 96/417 |
| 9,821,260 B2* | 11/2017 | Stoner, Jr. | B01D 46/62 |
| 10,695,706 B2* | 6/2020 | Cho | B01D 46/46 |
| 2005/0120604 A1 | 6/2005 | Slowski | |
| 2005/0128732 A1 | 6/2005 | Potthoff | |
| 2005/0185389 A1 | 8/2005 | Henriet et al. | |
| 2007/0076421 A1 | 4/2007 | Kogo et al. | |
| 2009/0086508 A1 | 4/2009 | Bierhuizen | |
| 2010/0212819 A1 | 8/2010 | Salter et al. | |
| 2011/0157907 A1 | 6/2011 | Hwang et al. | |
| 2013/0044474 A1 | 2/2013 | Aikala et al. | |
| 2013/0083552 A1 | 4/2013 | Ruiz Ortega et al. | |
| 2015/0062890 A1 | 3/2015 | Camarota | |
| 2015/0109651 A1 | 4/2015 | Branda et al. | |
| 2022/0120454 A1* | 4/2022 | Krosney | F24F 7/003 |

FOREIGN PATENT DOCUMENTS

| | | |
|---|---|---|
| CN | 201859609 U | 6/2011 |
| CN | 202307001 U | 7/2012 |
| CN | 102095164 B | 10/2012 |
| CN | 104613409 A | 5/2015 |
| CN | 206429892 U | 8/2017 |
| CN | 207880741 U | 9/2018 |
| CN | 106568049 B | 3/2019 |
| CN | 209342961 U | 9/2019 |
| DE | 102009002502 A1 | 10/2010 |
| EP | 1050332 A2 | 11/2000 |
| JP | 2009034629 A | 2/2009 |
| JP | 2012119257 A | 6/2012 |
| JP | 2017152397 A | 8/2017 |
| JP | 2019067521 A | 4/2019 |
| KR | 101436366 B1 | 9/2014 |
| KR | 101436368 B1 | 9/2014 |
| KR | 101436370 B1 | 9/2014 |
| RU | 2639931 C1 | 12/2017 |
| WO | 2012141966 A1 | 10/2012 |
| WO | 2017161530 A1 | 9/2017 |

OTHER PUBLICATIONS

"Diffuser Films 3635-30, 3635-70 Envision™ Diffuser Films 3735-50, 3735-60", 3M, Product Bulletin Diffuser, 2012, pp. 1-6.
International Search Report for PCT International Application No. PCT/IB2020/061666, mailed on Mar. 9, 2021, 6 pages.

* cited by examiner

POWERED ROOM AIR PURIFIER WITH AIR-QUALITY VISUAL INDICATOR

CROSS REFERENCE TO RELATED APPLICATIONS

This application is a national stage filing under 35 U.S.C. 371 of PCT/IB2020/061666, filed Dec. 9, 2020, which claims the benefit of U.S. Provisional Patent Application No. 62/946,222, filed Dec. 10, 2019, the disclosure of which is incorporated by reference in its/their entirety herein.

BACKGROUND

Room air purifiers are often used to purify (e.g., to remove at least some fine particles from) ambient air, e.g., in rooms of houses, condominiums, apartments, offices, and so on.

SUMMARY

In broad summary, herein is disclosed a powered room air purifier with a visual indicator of air quality, the visual indicator comprising: a reflector that defines a forwardly-open-ended reflecting cavity and that comprises at least one through-opening in a floor or ceiling of the reflector; at least one diffuser layer that covers the forward opening of the forward-open-ended reflecting cavity; and, at least one LED light source that is positioned within the at least one through-opening, the LED light source and the reflector being configured so that the LED light source is shielded from line-of-sight view along a forward-rearward axis of the powered room air purifier.

These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties, unless otherwise specified). The term "substantially", unless otherwise specifically defined, means to a high degree of approximation (e.g., within +/−10% for quantifiable properties). The term "essentially" means to a quite high degree of approximation (e.g., within plus or minus 2% for quantifiable properties; it will be understood that the phrase "at least essentially" subsumes the specific case of an "exact" match. However, even an "exact" match, or any other characterization using terms such as, e.g., same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Figure 1:
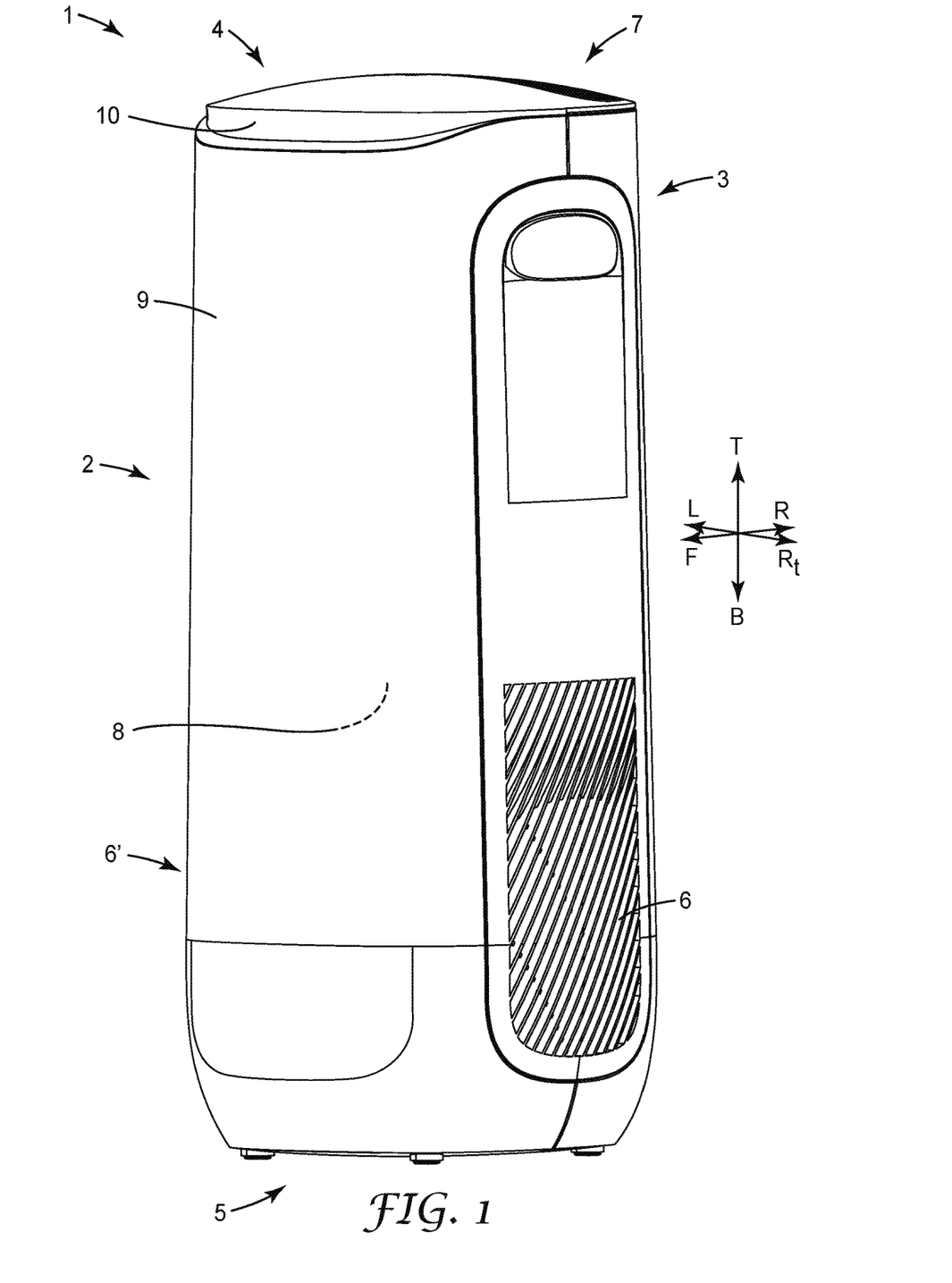
FIG. 1 is a front-side perspective view of an exemplary room air purifier as disclosed herein.

Shown in FIG. 1 in front-side perspective view is an exemplary powered room air purifier 1 that comprises a visual indicator 10 for purposes of informing a user of the air quality in an environment (e.g., a room) in which the room air purifier is located. Room air purifier 1 includes a housing 9 defining at least one air inlet 6, at least one air outlet 7, and an airflow path therebetween. Housing 9 may also establish front side 2, rear side 3, and top 4 and bottom 5 of the room air purifier. The vertical axis (with top and bottom directions indicated as T and B), lateral axis (with left and right directions indicated as L and $R_t$), and forward-rearward axis (F/R), of a room air purifier are identified in FIG. 1. All such terms and directions are used with respect to a room air purifier with its base resting on a floor or other horizontal surface in ordinary operation of the room air purifier.

Often, housing 9 of powered room air purifier 1 may be constructed of one or more panels, shrouds, pieces and the like that are assembled together to form a hollow interior defining an airflow path therethrough as well as providing spaces for components such as motors, control units, and so on. The panels, parts etc. that collectively form housing 9 may be made of any suitable material, e.g., they may be molded polymeric parts, formed metal pieces, and so on. Air inlet 6 may be provided at any suitable location, for example on a major side of the room air purifier. In the particular design depicted in FIGS. 1 and 2, two air inlets 6 and 6' are provided, one on each lateral side of the room air purifier.

Room air purifier 1 includes at least one fan that motivates (e.g., pushes or pulls) air through the filter media of a disposable air filter installed within the room air purifier. Any number of air outlets, at any location, may be provided so that the filtered air can exit the room air purifier. In the exemplary design of FIG. 1 an air outlet 7 is located at top end 4 of the room air purifier. Room air purifier 1 is a powered room air purifier, meaning that the fan is driven by electric power, possibly from an internal power source (e.g., battery) but more conveniently delivered through a cord from an external power source. Such a fan can be of any suitable type, e.g., a centrifugal (squirrel-cage) fan. The fan can be driven by an electric motor of any suitable type, e.g., a DC or AC motor of the type often used in room air purifiers. Typically, such a room air purifier can be moved, e.g., from room to room (e.g., by way of one or more carrying handles as are visible, unnumbered, in FIGS. 1 and 2).

In some embodiments a room air purifier 1 may comprise at least one cover plate that can be, e.g., opened and/or removed to allow access to an interior space of the room air purifier so that a disposable air filter can be inserted thereinto. Room air purifier 1 is configured to accept a disposable air filter thereinto. The term disposable generally denotes any air filter that is removable and replaceable by a fresh (or refurbished) filter, and thus encompasses filters that are recyclable. Any such air filter will comprise at least a particulate-filter layer that is capable of removing particles from air that flows along the airflow path through the room air purifier and passes through the filter. Such a particle-filtration layer may be comprised of any material, in any configuration, that is capable of filtering moving air. Such media may include, but is not limited to, fibrous materials (e.g., nonwoven webs, fiberglass webs, and so on), honeycomb structures loaded with filter media and/or sorbent material, and so on. In particular embodiments, the air filter may include at least one layer that comprises an electret material.

By definition, a powered room air purifier is not an HVAC (heating/cooling) unit. That is, a powered room air purifier is not configured to purposefully alter the temperature of the air that passes through the room air purifier, except for, e.g., minor frictional heating or such effects. However, in some embodiments a room air purifier may perform certain other functions in addition to filtering particles. For example, a room air purifier may comprise an air filter that is configured to capture odors, any of various gases or vapors, and so on.

Room air purifier 1 will comprise whatever controls are needed to operate the unit, e.g., electronic circuitry including, e.g., a control unit along with whatever ancillary electrical components are needed. The control unit is in operative connection with the fan (e.g., so that the fan can be turned on and off and operated at different fan speeds if desired), and may also be in operative connection with various controls and switches, monitors, displays and/or indicators, etc., that are provided on or within housing 9 and that allow a user to directly operate room air purifier 1 (e.g., to turn it off or on, to turn the fan speed up or down, etc.). In some embodiments the control unit may also be in operative connection (e.g., by hard-wire or fiber-optic connection) with a communication unit which allows the control unit to wirelessly communicate with an external device. Such arrangements can allow the room air purifier to be operated (and its operating status monitored) remotely, by way of signals sent back and forth between the external device and the control unit of the room air purifier, rather than being operated directly by way of controls located on the room air purifier itself. Such an external device may be any suitable device capable of receiving signals from a wireless communication unit and capable of transmitting signals and instructions to the wireless communication unit. In particular embodiments, the external device is a portable device such as a smartphone, a tablet computer, or a laptop computer.

Room air purifier 1 will comprise at least one at least one air quality sensor 8 (shown in exemplary, generic representation in FIG. 1) that monitors unfiltered air. By this is meant that the sensor monitors at least the concentration of particles of a chosen size range (e.g., fine particles such as so-called PM2.5 particles) in air that has not yet passed through the filter of the room air purifier. The term air quality as used herein thus refers to at least the concentration of such particles in the air. In some embodiments, the air quality sensor may evaluate non-particulate parameters such as the quantity of volatile organic chemicals in the air, the quantity of formaldehyde in the air, or the like.

Room air purifier 1 comprises at least one visual indicator 10 that provides a visual indication of the air quality as ascertained by air quality sensor 8. By definition, the side of room air purifier 1 that bears visual indicator 10 will be referred to herein as the "front" side 2 of the room air purifier. Visual indicator 10 will be in operative connection with circuitry that receives data from the air quality sensor, which circuitry is configured to cause the visual indicator to assume or otherwise display a particular visual appearance in response to a particular air quality measured by the air quality sensor.

In many embodiments, the visual appearance that is displayed by the visual indicator will be color. For example, a series of colors, ranging from, e.g., green to yellow to orange to red to purple, may be used to indicate air quality ranging from good to moderate to poor. Various possible arrangements by which visual indications may be provided are presented in further detail later herein.

A visual indicator 10 may be located in any position on the front side 2 of room air purifier 1. In many convenient embodiments, a visual indicator 10 may be located at or near the top of front side 2, as in the exemplary design depicted in FIG. 1. A visual indicator will at least be visible from a position directly in front of the room air purifier. In some embodiments, a visual indicator may wrap partially around onto the left and right lateral sides of the room air purifier, and/or may wrap partially up onto the top surface of the room air purifier. Or, multiple visual indicators may be provided to achieve a similar effect.

Figure 2:
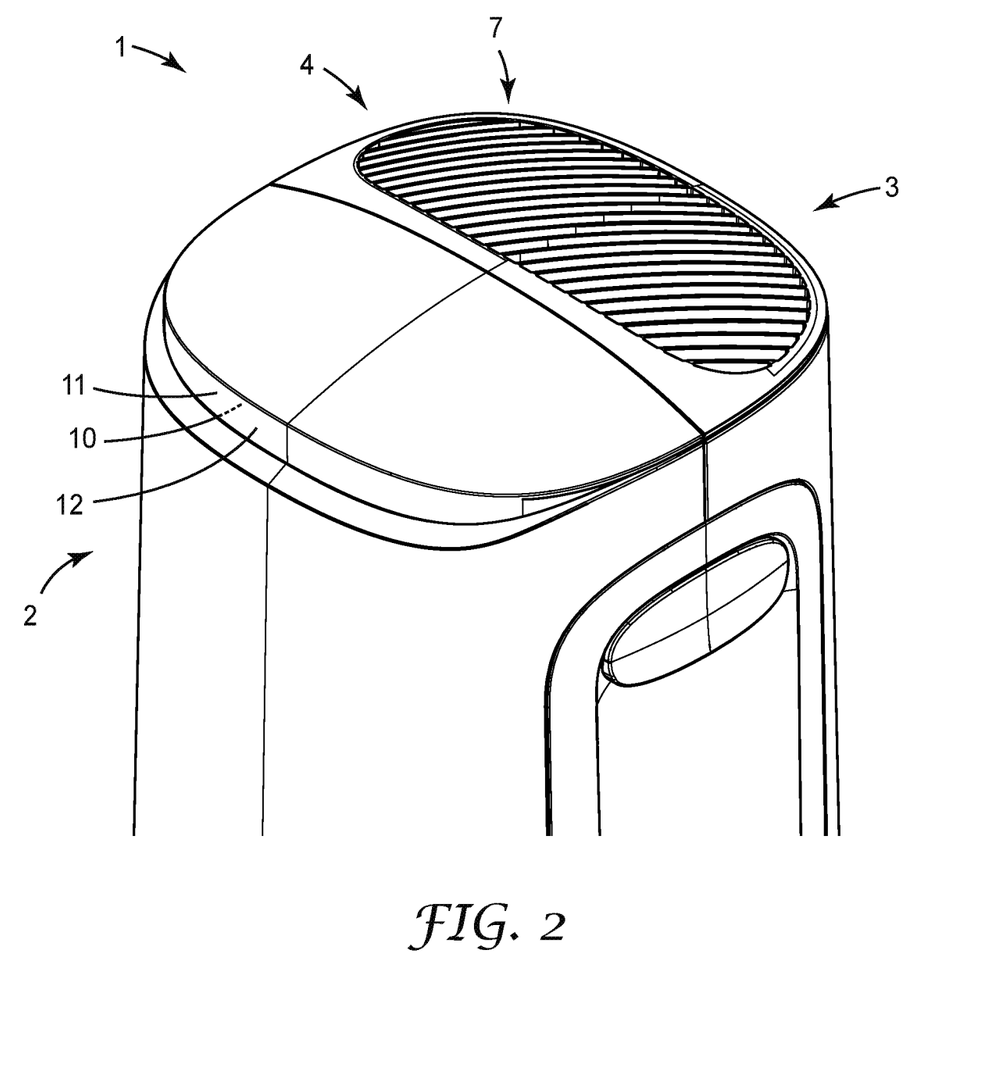
FIG. 2 is a closeup view of the upper portion of the room air purifier of FIG. 1.

In some embodiments a visual indicator 10 may be positioned behind (rearward of) a front cover 11 that provides a portion of housing 9 of the room air purifier, as indicated in FIG. 2. Such a front cover may, for example, provide physical protection for the visual indicator. Such a front cover should be light-transmissive to a sufficient extent to allow the appearance, e.g., color, of the visual indicator to be viewed through the front cover. Strictly speaking, only the portion 12 of front cover 11 behind which the visual indicator is placed and through which light emitted from the visual indicator will pass (which will be termed the "optical window" of the front cover) need be light-transmissive. However, in many embodiments it may be convenient that the entire front cover exhibit similar optical properties.

In some embodiments the optical window 12 of the front cover 11 may be relatively transparent. However, in some embodiments it may be translucent and/or may be dark-tinted. This may provide aesthetic benefits in that the various components of the visual indicator may not be visible through the front cover, which may provide a more sleek and elegant (e.g., "uncluttered") appearance. In some such embodiments, it may not be possible to tell that a visual indicator is present until the indicator illuminates so that a color is emitted through the light-transmissive front cover. In some such cases, the illumination provided by the visual indicator may be the only thing that is visible; that is, even when the visual indicator is "on", the components of the visual indicator may not be visible.

In some embodiments a front cover 11 may be a molded (e.g., injection molded) organic polymeric resin such as, e.g., polycarbonate, that is tinted to a chosen shade of darkness (e.g., smoke grey) by the addition of a suitable type and amount of darkening additive (e.g., dye, pigment, or the like).

The darkness of the optical window of the front cover (and, in general, the amount of light that can be seen through it) may be characterized in terms of luminous transmittance. The luminous transmittance of an item can be characterized by the procedures disclosed in ANSI Z87.1-2003, which is incorporated by reference in its entirety herein. In various embodiments, the luminous transmittance of at least the optical window 12 of front cover 11 through which light from visual indicator 10 is to pass, may be at most 85, 67, 55, 43 or 29%. In further embodiments, the luminous transmittance may be at least 18, 35, 50, 60, or 70.

The darkness of front cover 11 may also be characterized in terms of a Shade Number which is derived from the luminous transmittance according to methods presented in the above-cited ANSI Z87.1-2003. In various embodiments, the front cover may exhibit a Shade Number of 1.3, 1.5, 1.7, 2.0, 2.5, or 3.0.

Figure 3:
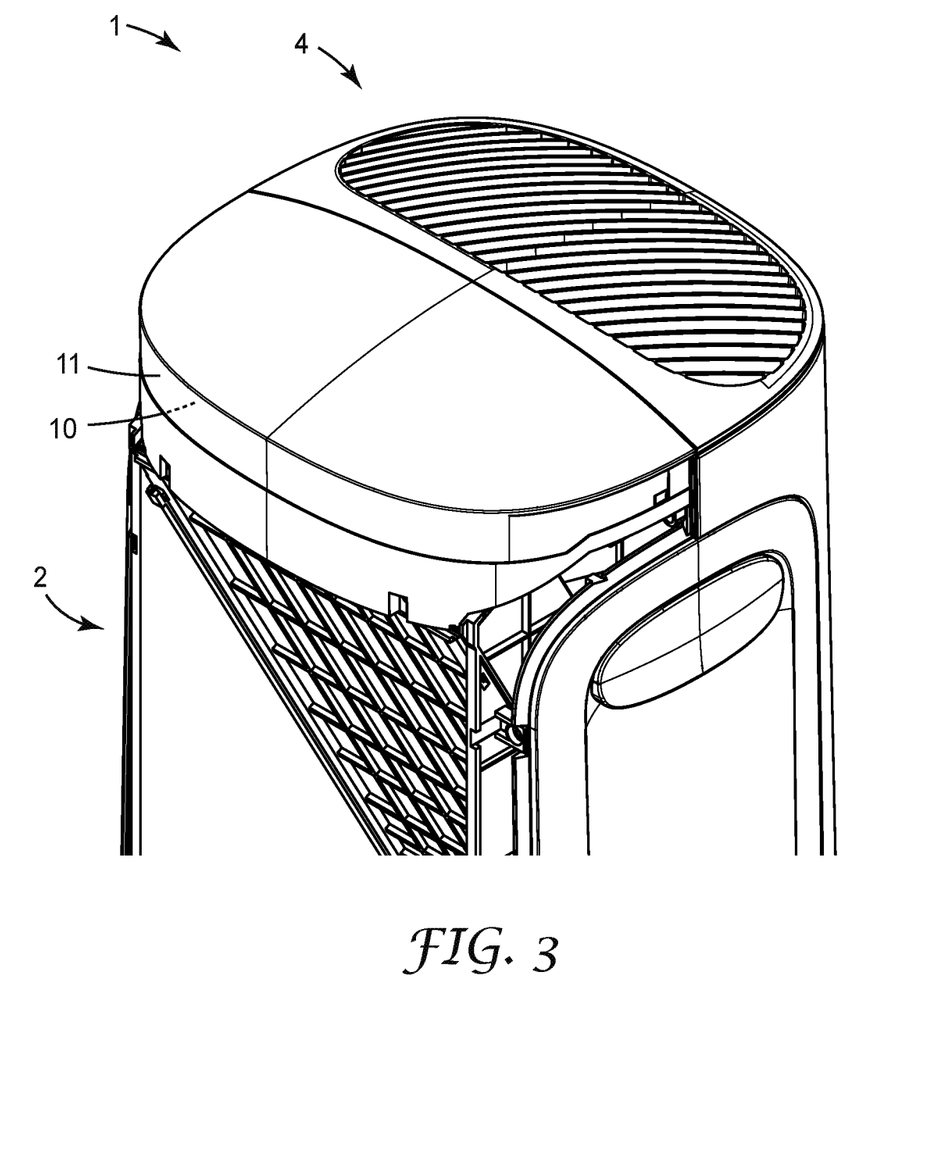
FIG. 3 is a closeup view as in FIG. 2, with a front panel of the room air purifier omitted.
Figure 4:
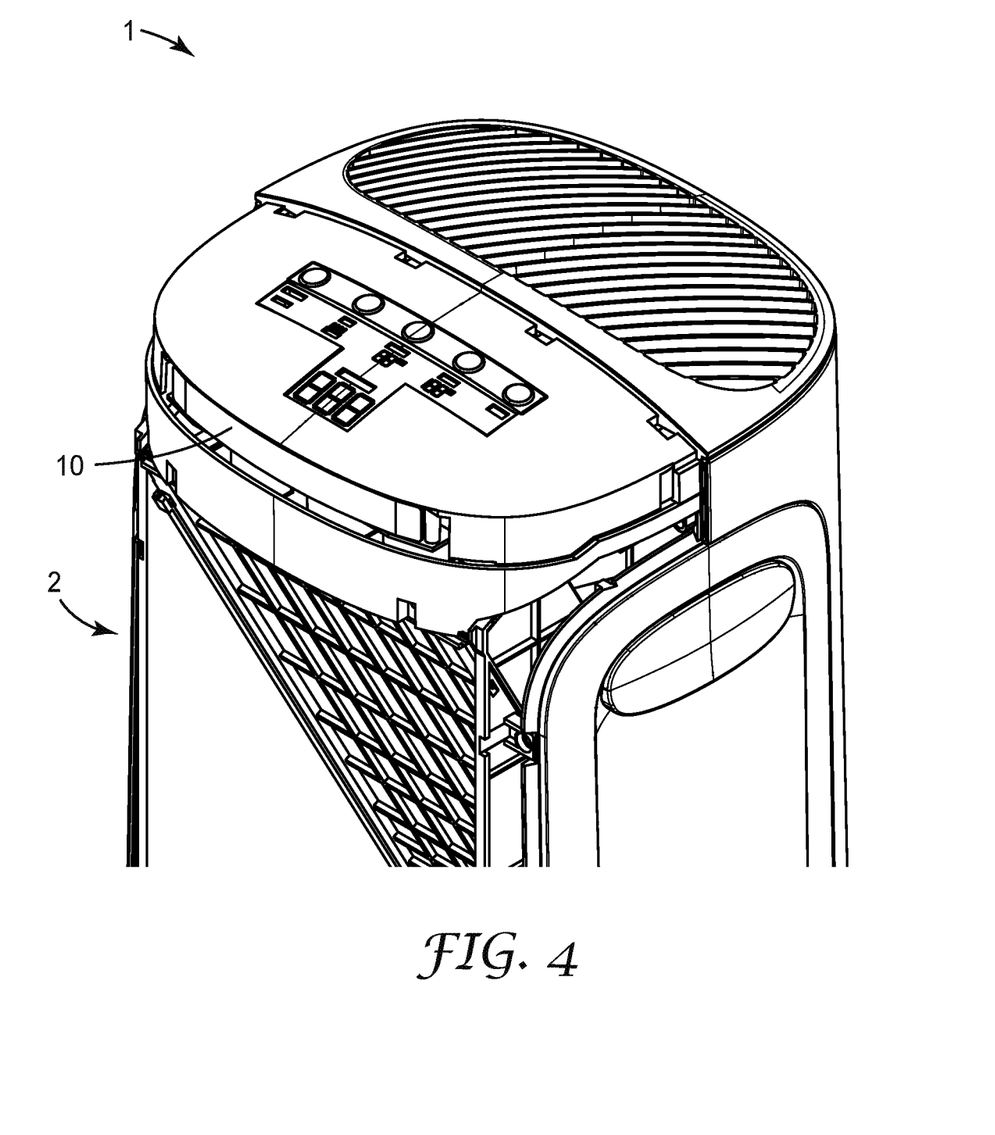
FIG. 4 is a closeup view as in FIG. 3, with a front-top panel of the room air purifier omitted.
Figure 5:
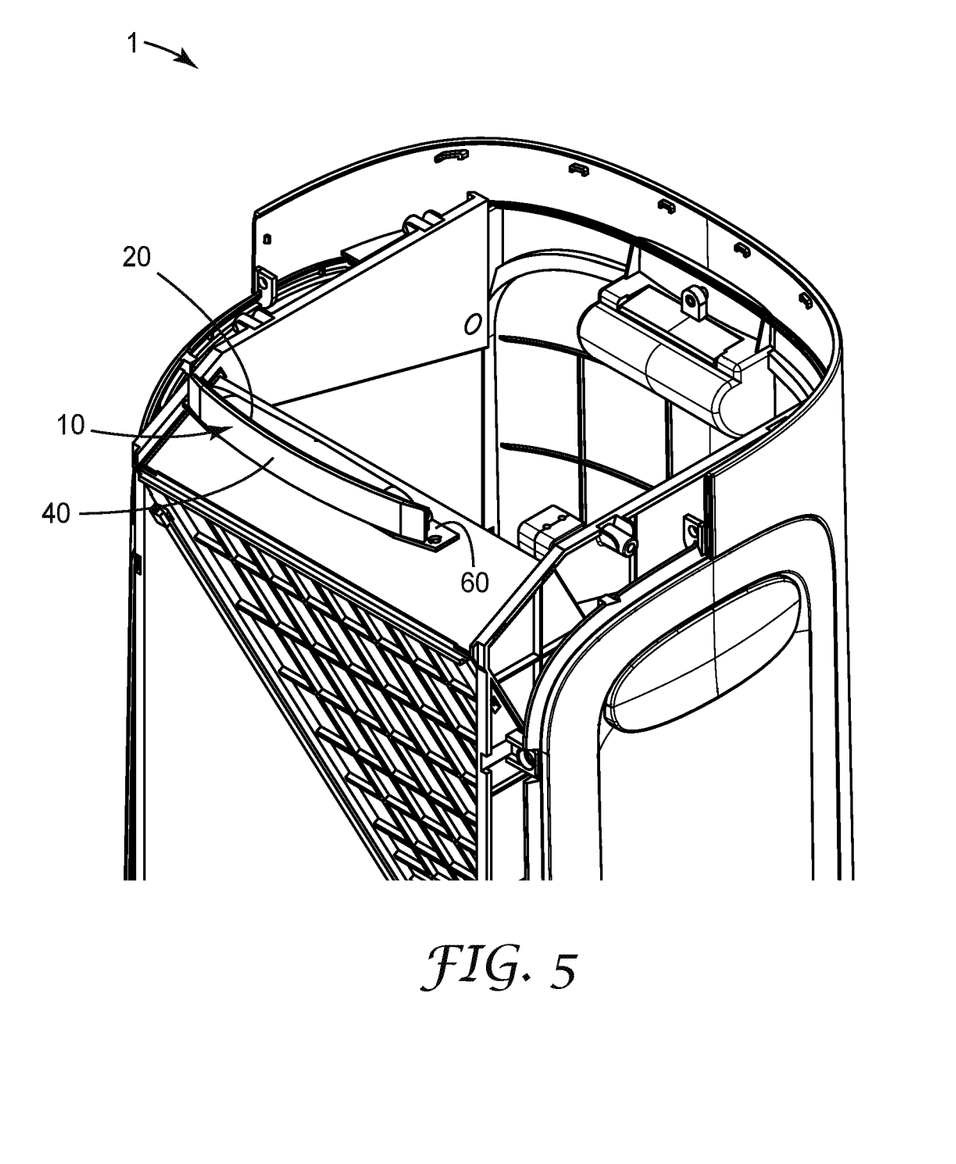
FIG. 5 is a closeup view as in FIG. 4, with various further panels and components omitted so that an exemplary visual indicator is fully revealed.

An exemplary visual indicator 10 is shown in FIGS. 3-5, in which various panels and components of room air purifier 1 are successively omitted (starting from the view of FIG. 2). In FIG. 3, a front panel is omitted, with visual indicator 10 still being covered by front cover 11. In FIG. 4, front cover 11 is omitted so that the front of visual indicator 10 is visible. In FIG. 5, a top cover and various other components of room air purifier 1 are omitted so that the exemplary visual indicator 10 is visible in its entirety. Exemplary visual indicator 10 is then shown in isolated view in FIG. 6. In some embodiments, visual indicator 10 and various components thereof exhibit an elongated shape with a longitudinal axis that is at least generally aligned with the lateral (left-right) axis of room air purifier 1, as is evident in the exemplary design of FIG. 5.

In general, visual indicator 10 comprises a reflector 20, e.g., a molded reflector, and at least one light source. In many convenient embodiments, the light source may be an LED light source, as discussed in more detail later herein. The present work has revealed that in many instances such a light source may cause a visible "hot spot" (i.e., a spot that is locally brighter than the surrounding area) even when viewed through a dark-tinted front cover 11. The arrangements presented herein are able to minimize (e.g., eliminate) any such hot spot so that a visual indication is presented as a color that extends, e.g., over the entire area of visual indicator 10 in a uniform and pleasing manner.

Figure 6:
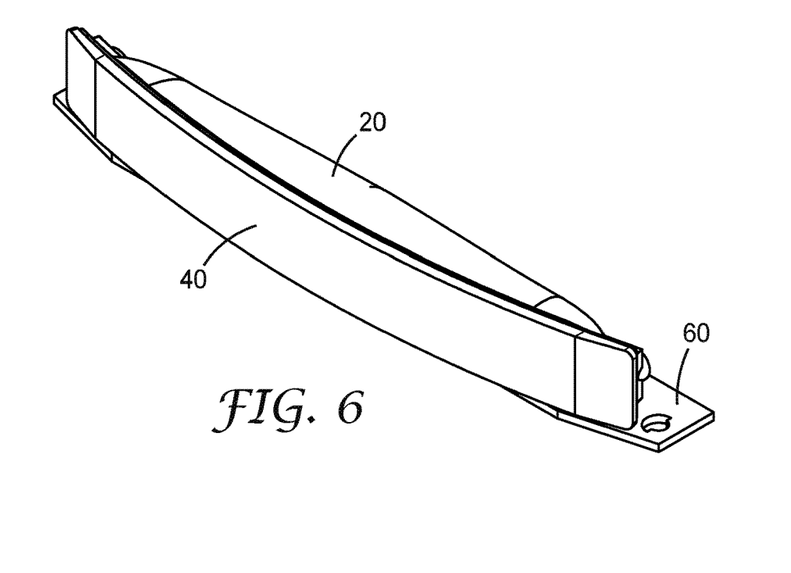
FIG. 6 is an isolated front-top-side view of an exemplary visual indicator.
Figure 7:
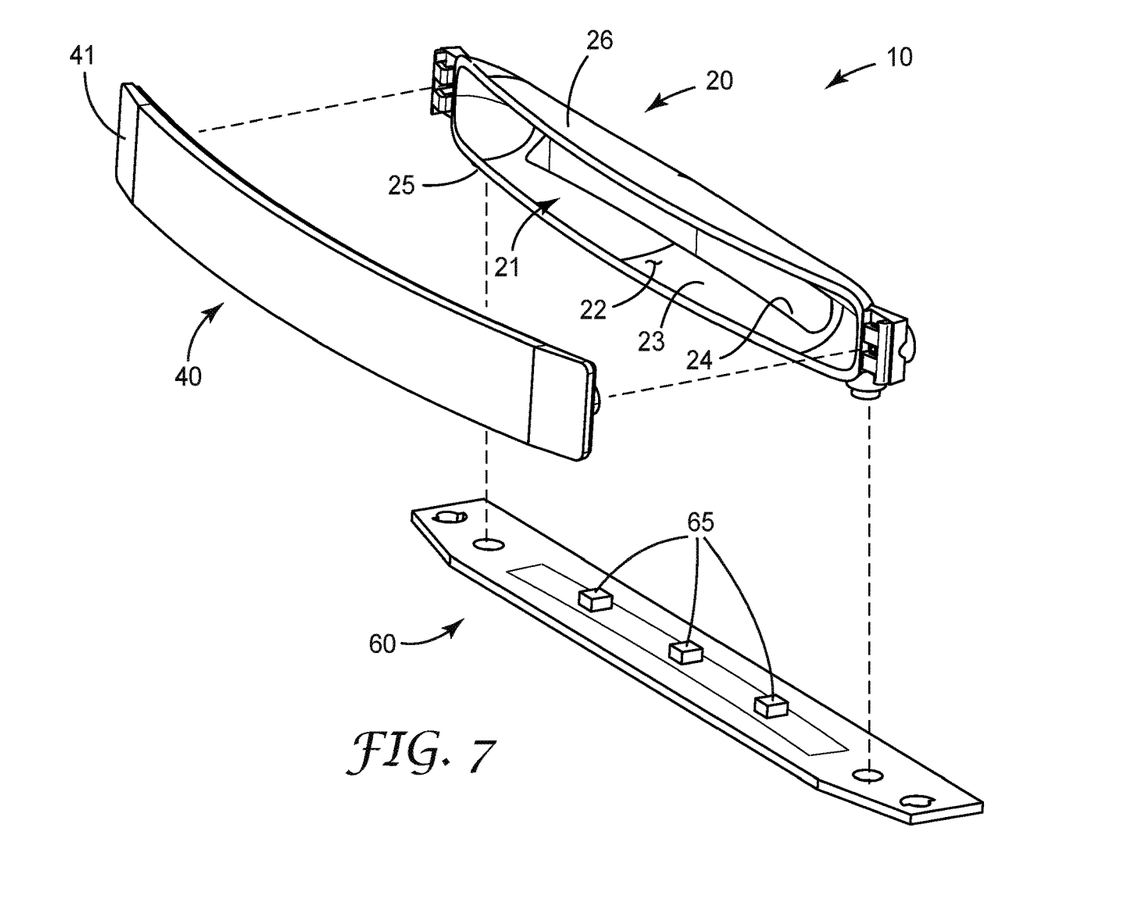
FIG. 7 is an exploded view of the visual indicator of FIG. 6.

A reflector 20 is depicted in exemplary embodiment (along with other components of visual indicator 10) in FIG. 6 and in exploded view in FIG. 7. Reflector 20 is further shown in top view in FIG. 8a, in bottom view in FIG. 8b, and in front view in FIG. 9. (In these Figures, as well as in FIGS. 11 and 12, forward-rearward axis F-R, longitudinal axis $L_g$, and/or vertical axis V are identified for clarity, noting that in the depicted design the longitudinal axis $L_g$ of visual indicator 10 will correspond to the lateral (left-right) axis of room air purifier 1.) As is evident from these Figures, reflector 20 will define a forwardly open-ended cavity 21 and will comprise an inner surface 23 that is diffuse-reflective. By diffuse-reflective is meant that surface 23 exhibits a reflectivity (as measured according to ASTM E1164-94 or the equivalent) of at least 60% and that is non-specular in nature. In various embodiments, surface 23 of reflector 20 may exhibit a reflectivity of at least 70, 80, or 90%.

This diffuse-reflectivity, which will enhance the ability to achieve a uniform visual indication, may be achieved in any suitable manner. For example, a reflective white paint may be sprayed onto inner surface 23 of reflector 20. Or, a diffuse-reflective layer (e.g., a microporous or microvoided polymeric material) may be affixed to the inner surface of reflector 20. In many convenient embodiments the desired diffuse-reflectivity may be achieved by molding reflector 20 out of an organic polymeric resin (e.g., high impact polystyrene, acrylonitrile-butadiene-styrene, and so on) that is loaded with a suitable reflective white particles (e.g., a pigment such as titanium dioxide, barium sulfate, and so on). The presence of the reflective white particles at and/or near the inner surface 23 of reflector 20 can render surface 23 suitably diffuse-reflective. Various diffuse-reflective materials films, and so on (as well as various diffusers that may not necessarily exhibit high reflectivity), are described in detail, e.g., in U.S. Pat. Nos. 6,282,821, 6,821,007, and 8,469,575, all of which are incorporated by reference in their entirety herein. Any such material may potentially be suitable for use in the present application.

In some embodiments at least some diffuse-reflectivity may be achieved by imparting molded inner surface 23 with surface texture. For example, a molding surface (e.g., of an injection-molding cavity) may be, e.g., sandblasted, bead-blasted, etched, and so on, to generate a surface texture which will then be imparted (in negative relief) to an organic polymeric material that is molded against the molding surface. Or, inner surface 23, even if smooth as molded, may be post-treated, e.g., by sandblasting, etching, laser ablation, or the like, to impart a desired surface texture. In short, the desired diffuse-reflectivity of inner surface 23 may be achieved by any of numerous mechanisms, alone or in combination.

As noted, reflector 20 may comprise an elongated shape with a longitudinal axis that, when reflector 20 is installed in room air purifier 1, is at least generally aligned with the lateral axis of the room air purifier. Reflector 20 may exhibit a floor 25 and a ceiling 26, that, in some embodiments, may extend in a generally straight direction along the long axis of reflector 20 along much or all of their extent, as evident from FIG. 9. Reflector 20 will define a forwardly-open-ended reflecting cavity 21 with a forward opening 22 that is defined, e.g., by forwardmost edges 29 of reflector 20, also as evident in FIGS. 7-9.

Figure 8A:
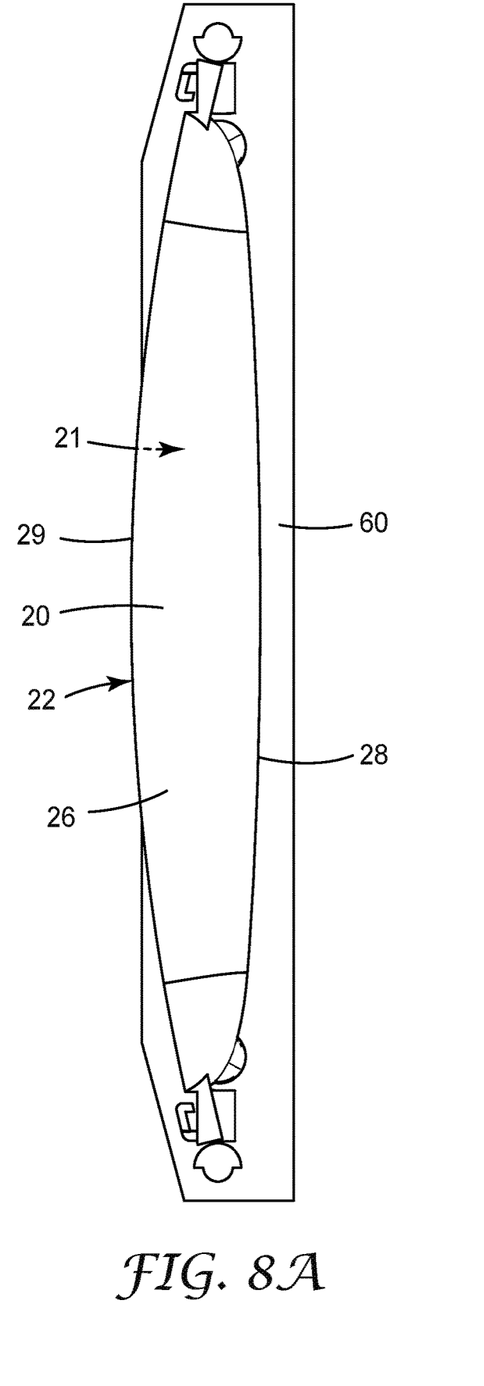
FIG. 8a is a top view of components of an exemplary visual indicator.
Figure 8B:
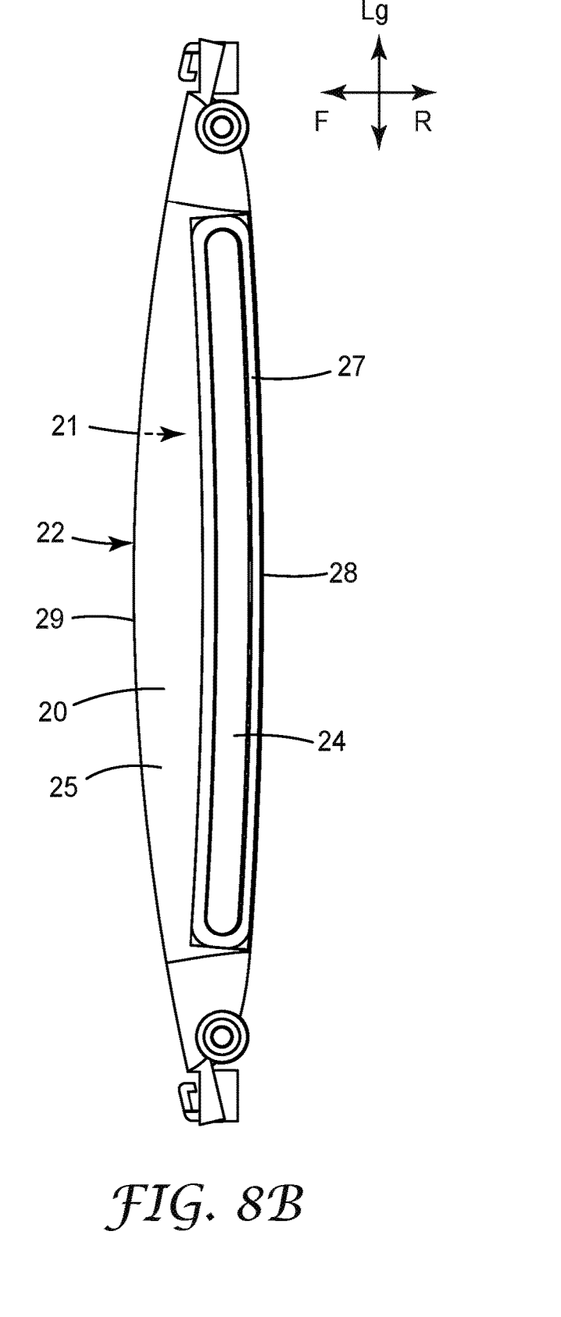
FIG. 8b is a bottom view of a component of an exemplary visual indicator.

In some embodiments, forward opening 22 (and, e.g., forwardmost edges 29 that define opening 22) may, when viewed along a vertical direction as in FIGS. 8a and 8b, exhibit a convex-forward shape. By convex-forward is meant that the entity in question follows a smooth curve with a central portion of the item being positioned further forward than the end portions of the item, as evident from FIGS. 8a and 8b. Such an arrangement can allow reflector 20, and thus visual indicator 10, to be abutted closely against the rear surface of a curved, convex-forward-shaped front cover 11 of the general type shown in FIGS. 2 and 3. Reflector 20 may be designed so that forwardmost edges 29 and opening 22 defined thereby exhibit any desired curvature, as characterized by a radius of curvature as measured when viewed along a vertical direction. In various embodiments, the radius of curvature of forward opening 22, as defined by forwardmost edges 29, may be at most 4, 2, 1, 0.5, or 0.2 meter. In further embodiments the radius of curvature may be at least 0.1, 0.15, 0.25, 0.4, 0.8, or 1.2 meter. The curvature may be relatively constant along the entire elongate length of reflector 20; or, it may vary along the elongate length.

In some embodiments, the rear wall 28 of reflector 20, in particular the inner (diffuse-reflective) surface 23 thereof, may, when viewed along a vertical direction as in FIGS. 8a and 8b, be arcuate. However, in some embodiments the curvature of the rear wall will not be congruent with the curvature of forward opening 22. Rather, as evident from FIGS. 8a and 8b, in some embodiments the rear wall 28 may be convex-rearward (rather than convex-forward in the manner of forward opening 22). In various embodiments, the radius of curvature of the inner surface of the rear wall (when viewed along the vertical axis) may be at most 6, 4, 2, 1 or 0.5 meter. In further embodiments the radius of curvature may be at least 0.2, 0.4, 0.8, or 1.2 meter. In some embodiments, the curvature of the rear wall 28 of reflector 20 may be less pronounced than the curvature of forward opening 22 of reflector 20, as in the exemplary designs of FIGS. 8a and 8b.

It has been found that the presence of at least one diffuser layer 40 can enhance the uniformity of the visual indication. As shown in exemplary embodiment in FIGS. 6 and 7, such a diffuser layer 40 may be positioned so that it covers forward opening 22 of reflecting cavity 21 that is defined by reflector 20, so that no light can escape reflecting cavity 21 in a manner that allows the light to pass forward through front cover 11 without passing through the diffuser layer 40. As noted later herein, in some embodiments a small gap may be present between some portion of diffuser layer 40 and some portion of a forward edge of reflector 20. However, even if this allows some light to escape, e.g., into the interior of room air purifier 1, the light may be intercepted by other components, e.g., panels, of the room air purifier without passing through front cover 11 to be visible to a user. Thus, any such internal light leakage may be inconsequential and it thus may not be necessary that diffuser layer 40 is abutted against reflector 20 so to provide a "hermetic" seal of cavity 21.

In some embodiments such a diffuser layer 40 may be provided by a portion of an injection molded body comprised, e.g., of an organic polymeric material. In some embodiments, the diffusion of light may be achieved primarily by scattering effects imparted by particles present in the molded body. The organic polymeric material of which the molded body is made thus may be loaded with suitable particles (e.g., white pigment particles) to achieve the requisite diffusion of visible light. In some embodiments (whether in combination with such effects, or in place of such effects), at least some diffusion of light may be achieved by providing surface texture, e.g., on a forward surface and/or a rearward surface of the molded body. That is, surface features of suitable dimension and geometry (including but not limited to, e.g., ridges, valleys, channels, posts, pits, lenses, and so on), whether uniform or irregular, can be chosen to achieve the desired effect on the light transmitted therethrough. Such features may be achieved, e.g., by molding the organic polymeric material against a mold surface bearing the opposite of such features, as will be readily understood.

Any of these effects may be used, alone or in combination. The type and loading of scattering particles, in combination with any surface texturing, may be chosen (in combination with the local forward-rearward thickness of the molded body at locations at which the light is to pass therethrough), can be chosen to provide the desired combination of light transmission and diffusion.

In other embodiments, a diffuser layer may be provided in the form of a film (e.g., a sheet) rather than as a molded body. Any such film may be cut to the proper size to cover opening 22 of reflector 20, and may be conformed to the shape of the opening (e.g., if the opening is convex-forward). A wide variety of diffuser films are available. Some such diffuser films may rely on, e.g., surface texture and/or particulate fillers in the general manner described above. (If a diffuser layer has a textured surface, the textured surface may face toward the light source or away from the light source, whichever provides the best overall performance.) Other diffuser films may rely on the presence of light-scattering cavities and/or interstitial spaces; for example, such films may take the form of microvoided polymer films, non-woven webs, paper, porous membranes and the like. Any such film may be loaded, e.g., with white pigment particles or the like if desired, with the light-scattering thus being achieved by way of void-space interfaces and/or interfaces between solid particles and polymeric materials and/or air. Combinations of any such effects and mechanisms may be used. Various materials that may be suitable for use (e.g., in film form) are described in the three U.S. patents that were incorporated by reference above.

Some such diffuser materials may exhibit some degree of reflectivity (e.g., they may be diffuse reflectors); such films may be used as diffuser layer 40 as long as they allow the requisite performance. In fact, in some instances the partial recycling of light within cavity 21 by a diffuser layer 40 that exhibits diffuse-reflectivity may further enhance the uniformity of the light that does eventually escape cavity 21 through diffuser layer 40. In some embodiments, a diffuser layer may comprise an appropriate amount of light-absorbing material (e.g., a dark pigment such as carbon black), e.g., if it is desired to modify the overall light transmission through the diffuser layer in this manner. However, in many embodiments it may be more convenient to modify the overall light transmission in some other manner, e.g., by controlling the tinting front cover 11, or by including a separate attenuator film as discussed later herein.

In various embodiments, a diffuser layer (e.g., a diffuser film or a molded diffuser body) may exhibit a visible light transmission of at least 30, 40, 50, 60, 70 or 80%. In further embodiments a diffuser layer may exhibit a visible light transmission of at most 85, 75, 65, 55, 45 or 35%. In various embodiments a diffuser layer may exhibit a transmission haze (as measured, e.g., according to ASTM D1003) of at least 50, 60, 70, 80, or 90%. In further embodiments a diffuser layer may exhibit a transmission haze of at most 95, 85, 75, 65 or 55%.

Diffuser layer 40 may be positioned so that it covers forward opening 22 of reflecting cavity 21 in any suitable manner. All that is required is that the coverage is sufficient that no external leakage of light (e.g., around edges of diffuser layer 40 and through front cover 11) occurs to an extent that compromises the uniformity of the visual indication. Thus in some embodiments, diffuser layer 40 need not necessarily be, e.g., attached to forward edges 29 of reflector 20. Rather, diffuser layer 40 may, in some instances, merely be closely abutted near edges 29 (meaning within 1.0 mm at their point of closest approach). In some embodiments, the terminal edges of diffuser layer 40 may overlap or extend beyond (e.g., by a distance of at least 1, 2 or 3 mm) forwardmost edges 29 of reflector 20. In some embodiments, even if some light escapes cavity 21, the light may be intercepted by other components, panels, or the like, of room air purifier 1, rather than escaping through front cover 11, as noted earlier herein.

In some embodiments a diffuser layer (whether in the form of a film or a molded body) 40 may be mechanically attached to the front of reflector 20. The diffuser layer and/or the reflector may be equipped with any suitable features (e.g., clips, posts, grips, notches, and so on) to facilitate such mechanical attachment. In other embodiments a diffuser layer may be adhesively attached to the front of reflector 20. For example a double-faced pressure-sensitive adhesive may be used to adhere the rear side of a diffuser layer 40 to forward edges 29 of reflector 20.

In other embodiments a diffuser layer may be attached to the rear major surface of the optical window 12 of front cover 11 of the room air purifier, at the location at which reflector 20 will be abutted against the rear major surface of front cover 11. Thus in such embodiments the diffuser layer 40 may not be present as a component of a pre-assembled visual indicator that is installed in the room air purifier; rather, the visual indicator may be completed when the front cover 11 (bearing the diffuser layer 40 on its rear side) is put in place with reflector 20 already having been installed. In a variation of such an approach, in some embodiments a rear surface of optical window 12 of front cover 11 may be, e.g., molded to have surface texture; or, after being molded, may be etched, ablated, or the like so that diffuser layer 40 is provided by a textured surface of front cover 11 itself.

It will be appreciated that any of the above approaches may be used in combination. That is, multiple diffuser layers 40 may be present in series along the path followed by light that is emitted from visual indicator 10. Thus, terminology such as "at least one diffusing layer" signifies that if desired, multiple diffusing layers can be positioned in series (e.g., stacked along a forward-rearward axis of the visual indicator) if desired. In some embodiments, a multilayer diffuser, comprising multiple (e.g., inseparable) sublayers, can be used.

In any such installation of a diffuser layer, the layer may be attached to any desired portion or component of reflector 20 (or, in general, any other component of visual indicator 10 or room air purifier 1), e.g., by mechanical or adhesive means as noted. In general, any form of attachment may be used, e.g., ultrasonic welding or the like.

As noted, visual indicator 10 will comprise at least one light source. In some particularly convenient embodiments, such a light source may be an LED light source 65. In some embodiments a single LED light source may be used. In some embodiments multiple LED light sources (e.g., two, three, four, five, or more) may be used, e.g., spaced along the longitudinal axis of reflector 20 and of visual indicator 10. The light sources may be spaced, e.g., equidistantly or may be bunched, as desired. While multiple LED light sources may offer the possibility of interesting visual effects as discussed later herein, it may be advantageous to limit the number of LED light sources for reasons of cost. However, the use of few, e.g., brighter, LED light sources may contribute to the occurrence of the previously-mentioned "hot-spots", which may be undesirable. Accordingly, the following arrangements have been found to provide advantages in terms of minimizing visual hot spots and promoting uniformity of the visual indication, above and beyond that already achieved by the use of a diffuse-reflective surface of the reflective cavity and the use of a diffuser layer through which the light leaves the reflective cavity.

Figure 10:
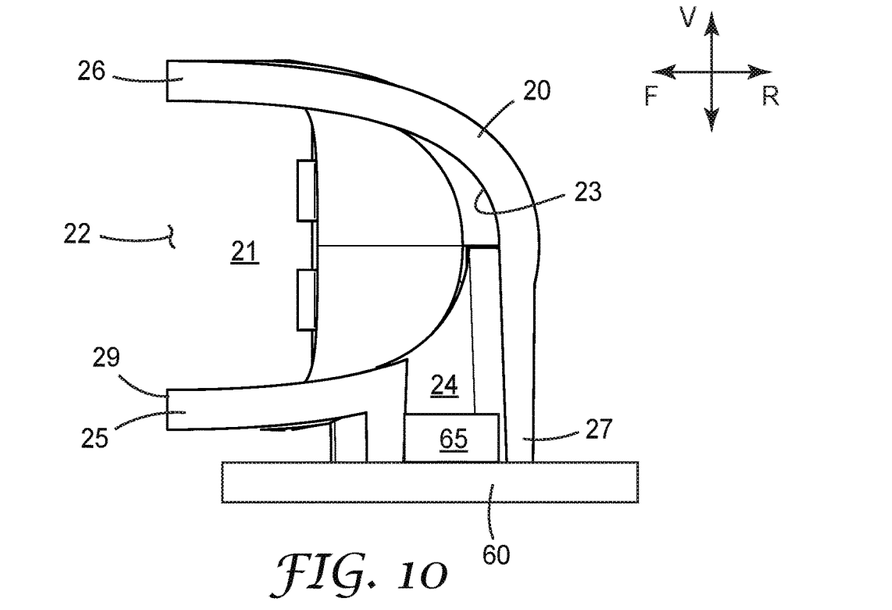
FIG. 10 is a side view of an exemplary visual indicator, with a diffuser layer of the visual indicator omitted.
Figure 11:
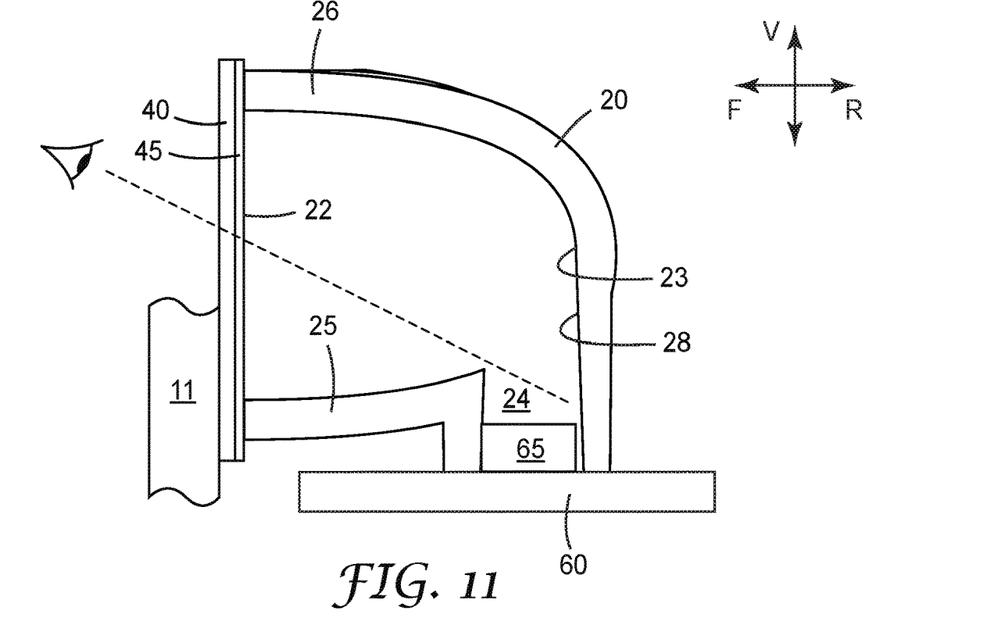
FIG. 11 is a side, slice view of an exemplary visual indicator as installed in a room air purifier.

In brief, such arrangements involve positioning the at least one LED light source so that it is shielded from line-of-sight view along a forward-rearward axis of the room air purifier. This is illustrated in FIG. 11, which is a cross-sectional view of a visual indicator 10 as installed in a room air purifier, looking along the long axis of reflector 20/visual indicator 10. (That is, the view is along the lateral axis of the room air purifier.) FIG. 11 is a cross-sectional "slice" view in which portions of the inner walls of reflector 20, and other components thereof (that are visible in the conventional cross-sectional view of FIG. 10), are omitted for ease of discussing the following geometric relationships.

In FIG. 11, an LED light source 65 is depicted. As evident in FIG. 11, the LED light source 65 is shielded from line-of-sight view by an observer who is positioned forward of the room air purifier and is looking at the room air purifier along the forward-rearward axis of the room air purifier. By shielded from line-of-sight view is meant that when the observer is looking at visual indicator 10 along the forward-rearward axis, the LED light source is not visible from at least within a viewing angle that is plus or minus 20 degrees from horizontal. In other words, a straight-line path from the viewers eyes to the LED light source is blocked at some point along the path by some portion of reflector 20. (In such an analysis the presence of diffuser layer 40, front cover 11, etc. are disregarded). In further embodiments, visual indicator 10 may be configured so that the LED light source is shielded from line-of-sight view at least within a viewing angle of plus or minus 30, 45, or 60 degrees. (By way of a specific example, the viewing angle illustrated in FIG. 11 is approximately minus 25 degrees; that is, 25 degrees downward from horizontal).

Such arrangements can provide that the LED light source will not be line-of-sight visible (and hence will be less likely to cause a "hot spot") over the majority of angles and conditions at which the visual indicator will be viewed in actual, ordinary use of the room air purifier. In some embodiments, it may be possible to view some portion of an LED light source along a line-of-sight path, e.g., at an extremely high viewing angle (e.g., when looking down at the visual indicator along a very steep downward path.) Such occurrences may be uncommon and may not pose a problem. However, in some embodiments, the visual indicator 10 (and/or other components of room air purifier 1) may be configured so that there is no viewing angle that allows direct line-of-sight visibility of the LED light source.

The present work has revealed that the use of one or more LEDS that are shielded from line-of-sight view in the manner discussed above, in combination with a diffuse-reflective inner surface of a reflector and a diffuser layer that covers the opening of the reflector, can achieve advantageous uniformity of a visual indication of air quality as seen by a user of a room air purifier. In some embodiments such uniformity may be manifested as a high luminance uniformity of light emitted by visual indicator 10, as may be characterized by methods disclosed later herein.

One exemplary manner in which the above-described arrangements can be achieved will now be described. In some embodiments, one or more LED light sources 65 can be provided on a supporting substrate 60 as shown in exemplary manner in FIG. 7. (In FIG. 7, three such LED light sources 65, spaced along the longitudinal axis of substrate 60, are present.) In some embodiments substrate 60 may be a printed circuit board (PCB) and any such LED light source can be disposed on the printed circuit board, e.g., through surface-mount technology (SMT). In FIG. 7, surface-mounted LEDs are shown in generic representation, and no conductive traces, connectors or the like are shown. However, ordinary artisans will readily understand how to dispose surface-mounted LEDs on a PCB, how to connect the PCB to other circuitry (e.g., via ZIF connector), and so on. Visual indicator 10 may be supported within room air purifier 1, e.g., by way of PCB 60 and/or reflector 20 being attached to any suitable component or components of room air purifier 1.

In the present arrangements, reflector 20 is provided with at least one through-opening 24 that extends completely through a floor 25 or ceiling 26 of reflector 20. At least one LED light source 65 can be positioned within through-opening 24 in such manner that the above-discussed geometric arrangements are satisfied. In the particular exemplary arrangement depicted in the Figures herein, there are three spaced-apart LED light sources 65 (as shown in FIG. 7); and, the at least one through-opening 24 is provided in the form of an elongated slot. A small portion of slot 24 is visible in FIG. 7; slot 24 is more fully visible in the bottom view of FIG. 8b and in the side views of FIGS. 10 and 11. Slot 24 is an example of an arrangement in which all of the LED light sources are positioned within a single (e.g., elongated, slot-like) through-opening; in other arrangements individual through-openings may be provided for each LED light source. Regardless of the specific arrangements, each LED light source may be disposed on a PCB 60 so that when the PCB 60 is brought together with reflector 20, each LED light source will reside in a through-opening 24, as will be appreciated from examination of FIG. 10 and examination of FIGS. 6 and 7 in combination.

Figure 9:
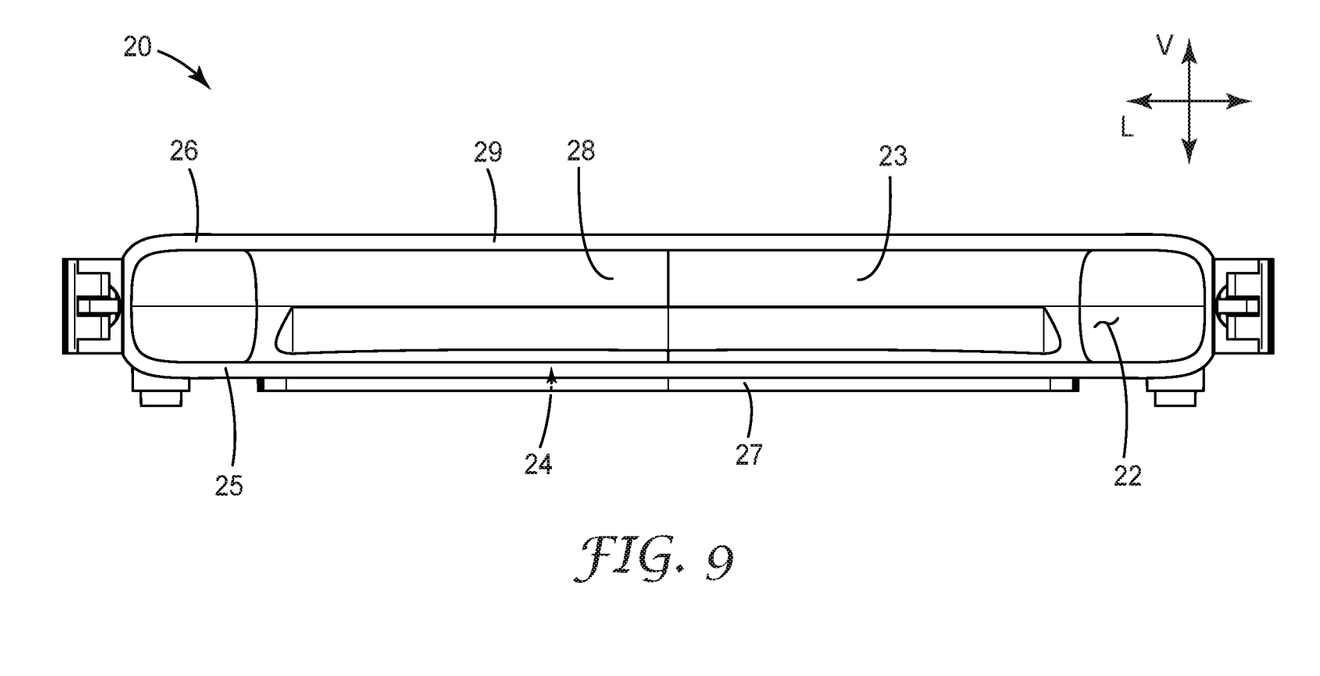
FIG. 9 is a front view of a component of an exemplary visual indicator.

In some embodiments such a through-opening may not take the form of a mere gap or interruption in the floor or ceiling of reflector 20. Rather, in some embodiments such a through-opening 24 may be defined at least in part by portions of the floor or ceiling that extend beyond neighboring portions of the floor or ceiling in a direction vertically away from the reflecting cavity 21 within the reflector 20. For example, FIGS. 9 and 10 depict an arrangement in which through-opening 24 of floor 25 of reflector 20 is defined in part by portions 27 of floor 25 that extend vertically downward below neighboring portions of floor 25. It will be appreciated that such arrangements, depending, e.g., on the vertical dimensions of the thus-formed through-opening, can facilitate the shielding of light source 65 within the through-opening.

Such arrangements can thus position an LED light source in a through-opening of floor 25 (as in the Figures herein) or in a through-opening of ceiling 26. In either case, an LED light source that is so positioned will emit light along a generally vertical direction (e.g., a generally upward direction, in the depicted arrangement). The light source will thus introduce light into reflecting cavity 21 along a direction that is at least generally orthogonal to the direction along which the light emitted from the visual indicator will be eventually viewed. Such arrangements may be contrasted with those in which, for example, a light source is disposed on a rear wall of a reflector so that the light source emits light generally along the same direction along which the light is to eventually be viewed. These arrangements may further enhance the uniformity of the visual indication. As is evident from FIGS. 10 and 11, such arrangements can provide that in some embodiments reflector 20, when viewed along its long axis, will exhibit a shape that is generally parabolic except that the parabolic profile is interrupted by the at least one through-opening 24 at least at some point along the elongate length of the reflector.

In some embodiments, when an LED-bearing substrate 60 (e.g., a PCB) is brought together with the reflector 20 (e.g., when an LED-bearing PCB is abutted against reflector 20), the substrate may partially or completely cover through-opening(s) 24. This can close off any escape routes for light emitted by the LEDs, and can further enhance the efficiency of visual indicator 10. If desired, a PCB may be white rather than the ubiquitous green (e.g., by way of comprising a white solder mask layer rather than a green solder mask layer), which may provide slightly enhanced performance. However, this may not be necessary, e.g., depending on the size of through-opening 24 in relation to the total inner surface area of reflector 20.

An LED light source can be any light source that relies on one or more light-emitting diodes. Such a diode may be contained in a protective shroud, may be accompanied by various ancillary components, may be mounted on a PCB (e.g., by SMT methods), and so on, as are well known and will not be discussed in detail herein. In view of the relatively small size of a visual indicator that would be compatible with a typical room air purifier, and the fact that room air purifiers are usually viewed indoors at relatively close distances, an LED light source may comprise a rated light output of, for example, at most 10, 50, 100, or 200 lumens. In instances in which multiple LED light sources are used, the LED light sources may be spaced at any suitable spacing, e.g., less than 5, 4, 3, 2, 1.5, or 1.0 cm. It may not be necessary that the light sources are arranged in a strictly straight line. For example, LEDs that are positioned on a PCB in such manner as to reside within an elongated slot 24 that is slightly arcuate as shown in FIG. 8b, may be positioned along an arcuate path. The LEDs will be controllable by circuitry of the room air purifier, to emit light of any of several desired colors. In some embodiments the brightness of the emitted light will also be controllable by the RAP circuitry.

In some embodiments the arrangements presented herein may be such that visual indicator 10 is able to provide a visual indication (e.g., an illuminated color that is visible through optical window 12 of front cover 11) that is at least generally or substantially uniform along the entire elongate length of visual indicator 10. However, in some embodiments, it may be desired to attenuate some of the emitted light at desired locations along the elongate length of the indicator. For example, it may be desired to attenuate more of the light near the lateral (left and right) ends of the visual indicator, so as to provide an edge "fade-out" which may be aesthetically pleasing in some instances.

To such ends, if desired an optional light-attenuating layer 45 may be positioned so that it covers at least a portion of the forward opening of the forward-open-ended reflecting cavity 21. The visible light transmission of the light-attenuating layer 45 may be position-selective, e.g., it can vary as desired along the longitudinal axis of the layer. For example, layer 45 may exhibit higher visible light transmission in a central area of the visual indicator and lower visible light transmission toward right and left ends of the visual indicator (designations of central and left and right are with respect to the long axis of layer 45 and of visual indicator 10.) In some embodiments, a position-selective light-attenuating layer 45 may be produced by taking a transparent (or translucent) film, and printing, e.g., dark ink on selected areas of the film at selected densities. In some embodiments, a film on which the ink is printed may be a diffuser film 40. However, in some instances it may be preferred to provide light-attenuating layer 45 as a separate film from diffuser 40, as in the arrangement of FIG. 11.

Visual indicator 10 may be any size that is compatible with a typical room air purifier (whether a console, tower, or tabletop model). In various embodiments, a visual indicator 10 may exhibit an elongate length of at least 5, 10, or 15 cm, and at most 40, 30, 20, 12, or 8 cm. In various embodiments, a visual indicator 10 may exhibit a height (or width, if the visual indicator is oriented vertically) of at least 0.5, 1.0, or 1.5 cm and at most 5, 4, 3 or 2 cm. In various embodiments, a visual indicator 10 may exhibit a depth (from diffuser layer 40 to the deepest point of reflector 20) of at least 0.5, 1.0 or 1.5 cm and at most 5, 4, 3 or 2 cm.

As noted earlier, the arrangements presented herein are able to minimize (e.g., eliminate) hot spots so that if desired, a visual indication can be presented as a color that exhibits a relatively uniform brightness over much or all of the entire area of visual indicator 10 (in particular, along its entire elongate length). The uniformity of the visual indication may be assessed in terms of luminance uniformity, according to the general principles outlined in U.S. Pat. No. 6,282,821. Luminance uniformity of a visual indicator may be measured using a luminance meter such as the Model KS-150 Luminance Meter available from Konica-Minolta or the equivalent. The luminance meter may be used to measure the luminance at various locations on the visual indicator. In view of the relatively small size of a visual indicator (e.g., in comparison to many light boxes, channel letters and displays), the luminance meter may be set to the smallest possible spot size (e.g., using a close-lens adaptor) and may be abutted closely against the front face of the diffuser layer. (The measurements should be performed on the visual indicator directly, i.e., in the absence of any tinted or darkened front cover 11.)

Measurements of luminance may be obtained at various locations of the visual indicator, with a sufficient number of repeat measurements being done to assure statistical validity. As used herein, luminance uniformity is characterized by a luminance uniformity ratio, which is the ratio of the highest luminance value exhibited by a visual indicator (e.g., at a putative hot spot), to the lowest luminance value that is exhibited. In various embodiments a visual indicator as disclosed herein may exhibit a luminance uniformity ratio of less than 2.0, 1.5, 1.4, 1.3, 1.1, 1.1, 1.05, or 1.02. The lower limit of a such a ratio will be 1.0. (If a visual indicator includes a position-selective light-attenuating layer of the general type described above, the measurements of luminance should be confined to areas of similar light-attenuating character so that the results are not skewed.)

It will be apparent that many variations of the above-discussed arrangements are possible. For example, reflector 20 may be positioned beneath printed circuit board 60, with one or more LED light sources 65 residing in a through-opening in the ceiling of the reflector rather than in the floor. While exemplary embodiments presented herein have relied on LED light sources in the form of actual LEDs that are positioned in a through-opening 24 of reflector 20, in some embodiments an LED light source that is so positioned, may take the form of a light-emitting end of a light guide. Such a light guide can receive light from an LED and emit the light from an end of the light guide that is positioned within a through-opening 24 of collector 20; such arrangements are encompassed within the present disclosures. In some embodiments a visual indicator and components thereof may exhibit a longitudinal axis that is oriented in the vertical direction rather than the horizontal direction (that is, the visual indicator may extend up and down along the front side of the room air purifier rather than extending left to right). In such cases, all the arrangements presented herein still apply, but with all descriptions being rotated 90 degrees. It is thus understood that such arrangements fall within the present disclosure.

The arrangements presented herein allow the use of color as an indication of air quality. For example, a series of colors, going from, e.g., green to yellow to orange to red to purple, may be used to indicate air quality ranging from good to moderate to poor. In some embodiments, each color may be presented in a spatially uniform manner. For example, a green color of spatially uniform brightness may be presented in the event that the air quality is good, a red color in the event that the air quality is poor, and so on. If necessary, the circuitry that operates the LED light source(s) may be configured to modify the power to the light source(s) as a function of the color displayed (e.g., so that all of the various colors are displayed at a brightness that a viewer will perceive to be similar to each other). In some embodiments the circuitry may be configured so that the user can set the overall brightness of the visual display, e.g., to account for differences in the ambient brightness of the room environment. For example, the visual indicator may be switchable between a day mode and a night mode (or, in general, a bright mode and a dim mode, and/or any number of intermediate modes), with the power delivered to the light source(es) being adjusted accordingly. As noted, in some embodiments a visual indication may be spatially nonuniform, e.g., by way of exhibiting edge-fade (even in such cases, it will still be advantageous to minimize or eliminate any hot spots).

In some embodiments each color may be presented in a temporally uniform manner. For example, in the event that the air quality is moderate, a steady, uniform yellow color may be presented that does not change with time (except to change to a different color if the air quality improves or worsens). However, in some embodiments one or more colors may be presented in a way that varies with time. In particular, if multiple LED light sources are used, this enables certain arrangements that can allow additional information to be displayed. For example, as noted, color may be used as a primary parameter that is indicative of the current state of the air quality. A time-varying motion of this color may be used as a secondary parameter that is indicative of the trend in air quality. For example, if multiple LED light sources are present, rather than displaying a static color (e.g., yellow for moderate air quality), the LED light sources can be operated by the circuitry to provide a color that sweeps from left to right along the visual indicator (and repeats) if the air quality is trending upward, and that sweeps from right to left (and repeats) if the air quality is trending downward. It will be appreciated that many such arrangements are possible, and can be achieved by configuring the circuitry to operate the multiple LED light sources in temporal patterns other than simply a uniform, on/off manner. In a further example, a yellow, sweeping left-to-right pattern that signifies that the air quality is moderate but that the trend is improving, could be modified so that the rightmost light source displays a color that is, e.g., green or yellowish-green. Conversely, a sweeping right-to-left pattern that signifies a worsening of air quality, could be modified so that the leftmost light source displays a red hue.

If multiple LED light sources are present, it is also possible to convey the trend in air quality by spatially varying the actual color that is presented rather than using time-varying movement. For example, in the case of a (static, i.e., non-sweeping) yellow color indicative of moderate air quality, if the trend is toward improved air quality the far right end of the visual indication could display a green hue. Conversely, if the trend is toward poorer air quality the far left end of the visual indication could display a red hue. (It will be appreciated that all of the above-presented examples are for purposes of illustration and that such arrangements can be implemented in many different variations.)

It will thus be appreciated that the arrangements disclosed herein can allow the presentation of multiple types of information, each without limiting the other information that can be provided. Such information is not necessarily limited to air quality values or trends. For example, the visual indicator could flash for some designated period after the room air purifier is turned on in order to provide an indication that the circuitry has detected that the disposable air filter is approaching the end of its useful life. Any such parameters and modes of operation may be factory set (e.g., in firmware) or they may be settable and adjustable by the user of the room air purifier (e.g., in user-adjustable software).

It will be apparent to those skilled in the art that the specific exemplary embodiments, elements, structures, features, details, arrangements, configurations, etc., that are disclosed herein can be modified and/or combined in numerous ways. It is emphasized that any embodiment disclosed herein may be used in combination with any other embodiment or embodiments disclosed herein, as long as the embodiments are compatible. For example, any herein-described feature or arrangement of a reflector (e.g., a molded reflector) may be used in combination with any herein-described feature or arrangement of a diffuser layer and/or of an LED-bearing PCB, as long as such features and arrangements result in a compatible combination. Similarly, the methods disclosed herein may be used with a reflector, diffuser layer, and/or LED-bearing PCB comprising any of the features or arrangements disclosed herein. While a limited number of exemplary combinations are presented herein, it is emphasized that all such combinations are envisioned and are only prohibited in the specific instance of a combination that is incompatible.

In summary, all such variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A powered room air purifier comprising an air inlet, an air outlet and an airflow path therethrough that passes through an air filter, and comprising at least one air quality sensor that monitors unfiltered air;
    wherein the powered room air purifier comprises a visual indicator of air quality, the visual indicator comprising:
    a molded reflector that defines a forwardly-open-ended reflecting cavity and that comprises a diffuse-reflective inner surface, the molded reflector comprising an elongated shape with a longitudinal axis that is at least generally aligned with a lateral axis of the room air purifier, the molded reflector further comprising at least one through-opening in a floor or ceiling of the molded reflector;
    at least one diffuser layer that covers the forward opening of the forward-open-ended reflecting cavity so that substantially no light can escape the reflecting cavity without passing through the at least one diffuser layer; and,
    at least one LED light source that is positioned within the at least one through-opening in the floor or ceiling of the molded reflector, wherein the LED light source and the molded reflector are configured so that the LED light source is shielded from line-of-sight view along a forward-rearward axis of the powered room air purifier within a viewing angle that is plus or minus 20 degrees from horizontal.

2. The powered room air purifier of claim 1 wherein the at least one LED light source comprises at least two LED light sources that are spaced along the longitudinal axis of the molded reflector.

3. The powered room air purifier of claim 1 wherein the at least one LED light source comprises at least three LED light sources that are spaced along the longitudinal axis of the molded reflector and that are each positioned within a single through-opening that is an elongate slot that extends generally along the longitudinal axis of the molded reflector.

4. The powered room air purifier of any of claims 1-3 wherein the molded reflector is made of an injection-molded organic polymeric resin that is loaded with white inorganic particles.

5. The powered room air purifier of any of claims 1-4 wherein the diffuse-reflective inner surface of the molded reflector exhibits a reflectance of at least 80%.

6. The powered room air purifier of any of claims 1-5 wherein the at least one diffuser layer that covers the forward opening of the forward-open-ended reflecting cavity is a portion of an injection-molded body.

7. The powered room air purifier of any of claims 1-5 wherein the at least one diffuser layer that covers the forward opening of the forward-open-ended reflecting cavity is diffuser film.

8. The powered room air purifier of any of claims 1-7 wherein the at least one diffuser layer is mechanically attached to the molded reflector.

9. The powered room air purifier of any of claims 1-7 wherein the at least one diffuser layer is adhesively attached to the molded reflector.

10. The powered room air purifier of any of claims 1-7 wherein the at least one diffuser layer is attached to a major rear surface of a light-transmissive optical window of a front cover of the room air purifier.

11. The powered room air purifier of any of claims 1-10 wherein the room air purifier comprises a front cover and wherein the visual indicator of air quality is positioned rearward of a light-transmissive optical window of the front cover with the forward opening of the molded reflector of the visual indicator facing the optical window with the at least one diffuser layer closely abutted against a major rear surface of the optical window.

12. The powered room air purifier of claim 11 wherein at least the light-transmissive optical window of the front cover of the room air purifier exhibits a Shade Number of from 1.3 to 2.5.

13. The powered room air purifier of any of claims 1-12 wherein the at least one LED light source is surface-mounted to a printed circuit board so that the LED light source protrudes from the printed circuit board; and, wherein the printed circuit board is abutted against the molded reflector so that the at least one LED light source is positioned within the at least one through-opening and so that the at least one through-opening in the floor or ceiling of the molded reflector is at least substantially covered by a portion of the printed circuit board.

14. The powered room air purifier of any of claims 1-12 wherein the through-opening in the floor or ceiling of the molded reflector is defined at least in part by portions of the floor or ceiling that extend beyond neighboring portions of the floor or ceiling in a direction vertically away from the reflecting cavity.

15. The powered room air purifier of any of claims 1-14 wherein the diffuse-reflective inner surface of the molded reflector, when viewed along the longitudinal axis of the molded reflector, exhibits a generally parabolic shape that is interrupted by the at least one through-opening within which the at least one LED light source is positioned.

16. The powered room air purifier of any of claims 1-15 wherein the forward opening of the forwardly-open-ended reflecting cavity, when viewed along a vertical direction, exhibits a convex-forward shape and wherein the at least one diffuser layer that covers the forward opening is conformed to the forward opening so that the at least one diffuser layer, when viewed along a vertical direction, exhibits an arcuate shape with radius of curvature of less than one meter.

17. The powered room air purifier of any of claims 1-16 wherein an inner surface of a rear wall of the molded reflector, when viewed along a vertical direction, is convex-rearward so that the inner surface of the rear wall, when viewed along the vertical direction, exhibits a radius of curvature of less than two meters.

18. The powered room air purifier of any of claims 1-17 wherein the visual indicator further comprises a light-attenuating layer that covers at least a portion of the forward opening of the forward-open-ended reflecting cavity, and wherein the visible light transmission of the light-attenuating layer varies along the longitudinal axis of the molded reflector so as to exhibit higher visible light transmission in a laterally central area of the visual indicator and lower visible light transmission toward right and left lateral ends of the visual indicator.

19. The powered room air purifier of any of claims 1-18 wherein the at least one LED light source comprises at least one color-variable LED so that the visual indicator of air quality is a color-changing visual indicator and wherein the at least one LED light source is operatively connected to circuitry that receives data from the air quality sensor, which circuitry is configured to cause the at least one LED light source to display a particular color in response to a particular air quality measured by the air quality sensor.

20. The powered room air purifier of any of claims 1-19 wherein the LED light source and the molded reflector are configured so that the LED light source is shielded from line-of-sight view along a forward-rearward axis of the powered room air purifier within a viewing angle that is plus or minus 30 degrees from horizontal.

* * * * *